United States Patent
Kim et al.

(10) Patent No.: US 12,508,956 B2
(45) Date of Patent: Dec. 30, 2025

(54) SEAT MOVING APPARATUS FOR VEHICLE

(71) Applicants: HYUNDAI TRANSYS INC., Seosan-si (KR); DAEDONG MOVEL SYSTEM CO., LTD., Siheung-si (KR)

(72) Inventors: Yun Soo Kim, Incheon (KR); Young Sic Joo, Siheung-si (KR); Gyeong Min Kim, Hwaseong-si (KR); In Gul Baek, Hwaseong-si (KR); Ki Young Yun, Incheon (KR)

(73) Assignees: HYUNDAI TRANSYS INC., Seonsan-si (KR); DAEDONG MOVEL SYSTEM CO., LTD., Siheung-si (KR)

(*) Notice: Subject to any disclaimer, the term of this patent is extended or adjusted under 35 U.S.C. 154(b) by 260 days.

(21) Appl. No.: 18/268,984

(22) PCT Filed: Feb. 10, 2022

(86) PCT No.: PCT/KR2022/002040
§ 371 (c)(1),
(2) Date: Jun. 22, 2023

(87) PCT Pub. No.: WO2022/173243
PCT Pub. Date: Aug. 18, 2022

(65) Prior Publication Data
US 2024/0116403 A1  Apr. 11, 2024

(30) Foreign Application Priority Data
Feb. 10, 2021 (KR) .................. 10-2021-0018738

(51) Int. Cl.
*B60N 2/06* (2006.01)
*B60N 2/02* (2006.01)
*B60N 2/07* (2006.01)

(52) U.S. Cl.
CPC ......... *B60N 2/067* (2013.01); *B60N 2/02246* (2023.08); *B60N 2/02258* (2023.08); *B60N 2/0722* (2013.01)

(58) Field of Classification Search
CPC .......................... B60N 2/067; B60N 2/02246; B60N 2/02258; B60N 2/0722; B60N 2/02253
See application file for complete search history.

(56) References Cited

U.S. PATENT DOCUMENTS 4,805,866 A * 2/1989 Aihara ............... B60N 2/02246
297/344.1
5,314,158 A * 5/1994 Mouri ................ B60N 2/02246
74/89.32

(Continued)

FOREIGN PATENT DOCUMENTS

CN 109774544 A 5/2019
DE 102013207665 A1 7/2014

(Continued)

OTHER PUBLICATIONS

Office Action dated Dec. 14, 2023 in German Patent Application No. 11 2022 001 016.9.

(Continued)

*Primary Examiner* — Milton Nelson, Jr.
(74) *Attorney, Agent, or Firm* — Quantum Patent Law Firm; Seongyoune Kang (57) ABSTRACT

A seat moving device for a vehicle, includes: a lead screw having a male thread formed on the outer circumferential surface thereof, and arranged in the front-rear direction of the vehicle under the bottom surface of the interior space of the vehicle; a drive motor; a worm gear rotationally driven by the drive motor; a worm wheel rotating in engagement with the worm gear; a transmission gear rotating integrally with the worm wheel; a belt for power transmission engaged with a spur gear of the transmission gear, and formed in a (Continued)

closed curve shape; a moving wheel having a female thread engaged with the male screw formed on the inner circumferential surface thereof; and a gear box having an accommodation space formed therein for accommodating the worm gear, the worm wheel, the belt for power transmission, and the moving wheel.

12 Claims, 11 Drawing Sheets

(56) References Cited

U.S. PATENT DOCUMENTS

| | | | |
|---|---|---|---|
| 9,139,110 B2* | 9/2015 | Bosecker | B60N 2/4214 |
| 2020/0086767 A1 | 3/2020 | Ogasawara et al. | |
| 2022/0014414 A1 | 1/2022 | Dai et al. | |

FOREIGN PATENT DOCUMENTS

| | | |
|---|---|---|
| DE | 102016224878 A1 | 6/2018 |
| DE | 102017101996 A1 | 8/2018 |
| DE | 102019103476 A1 | 6/2020 |
| JP | 2020-044858 A | 3/2020 |
| KR | 101407145 B1 | 6/2014 |

OTHER PUBLICATIONS

International Search Report for PCT/KR2022/002040, dated May 24, 2022.

* cited by examiner

SEAT MOVING APPARATUS FOR VEHICLE

CROSS-REFERENCE TO RELATED APPLICATIONS

This patent application is a U.S. National Stage Application of International Application No. PCT/KR2022/002040, filed Feb. 10, 2022, and the entire contents of which are incorporated herein by reference, which claims priority to Korean Application No. 10-2021-0018738, filed Feb. 10, 2021, and the entire contents of which are incorporated herein by reference.

TECHNICAL FIELD

The present disclosure relates to a seat moving apparatus for a vehicle, and more particularly to a seat moving apparatus for a vehicle configured not only to improve transmission efficiency of driving force but also to achieve a neat appearance by not exposing, to the outside, a lead screw configured to guide movement of a vehicle seat and a part of a gearbox.

BACKGROUND ART

In general, a driver's seat and a passenger seat are provided inside a vehicle, and the seat is configured to move forwards and rearwards depending on driver's or passenger's body types or driving habits.

As disclosed in Korean Patent No. 10-1407145, filed and patented by the present applicant, recently, a vehicle has a seat moving apparatus for a vehicle applied thereto and configured to move a seat forwards and rearwards with a simple operation of a switch using a drive source based on electricity, hydraulic pressure, pneumatic pressure, and the like.

Figure 1:
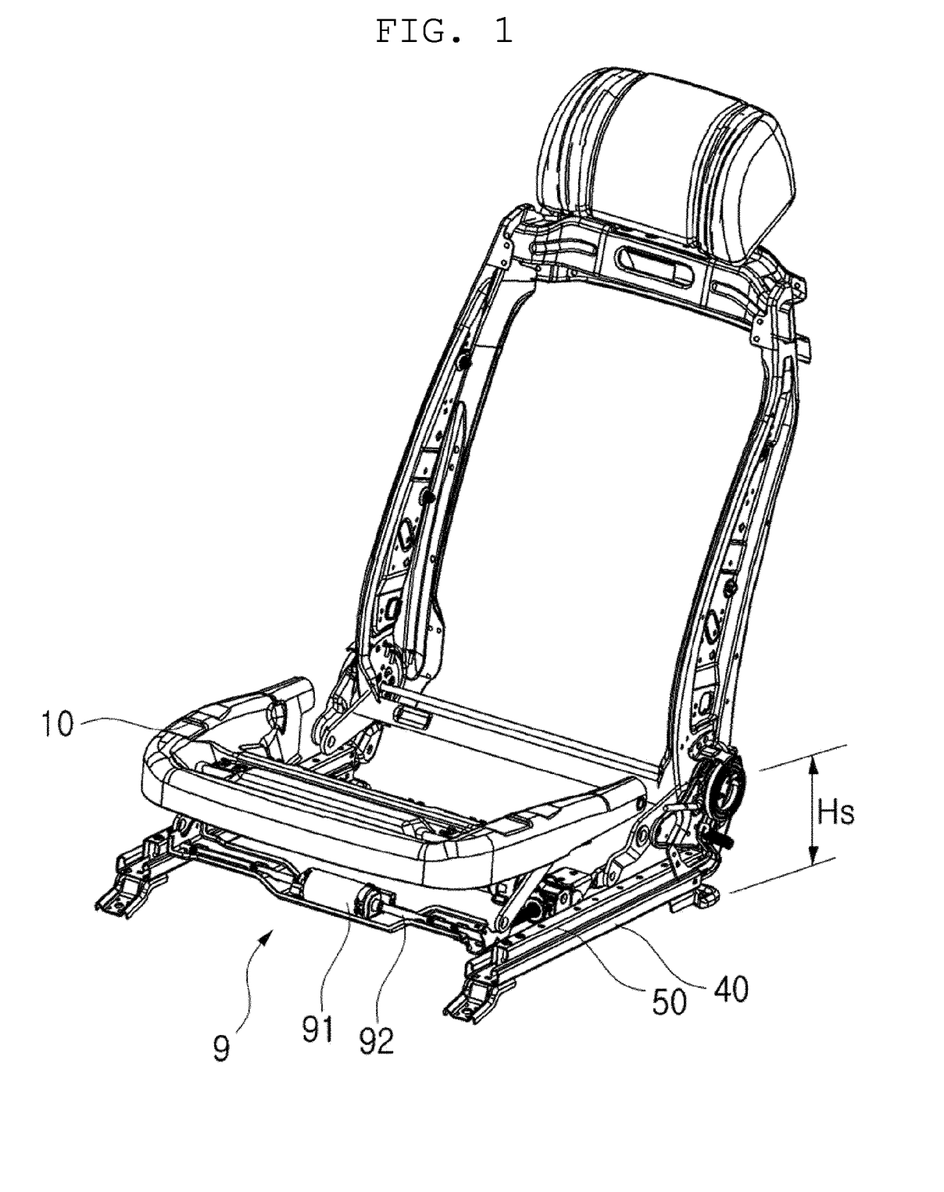
FIG. 1 is perspective view showing a configuration in which a seat moving apparatus for a vehicle is mounted on a seat.
Figure 2:
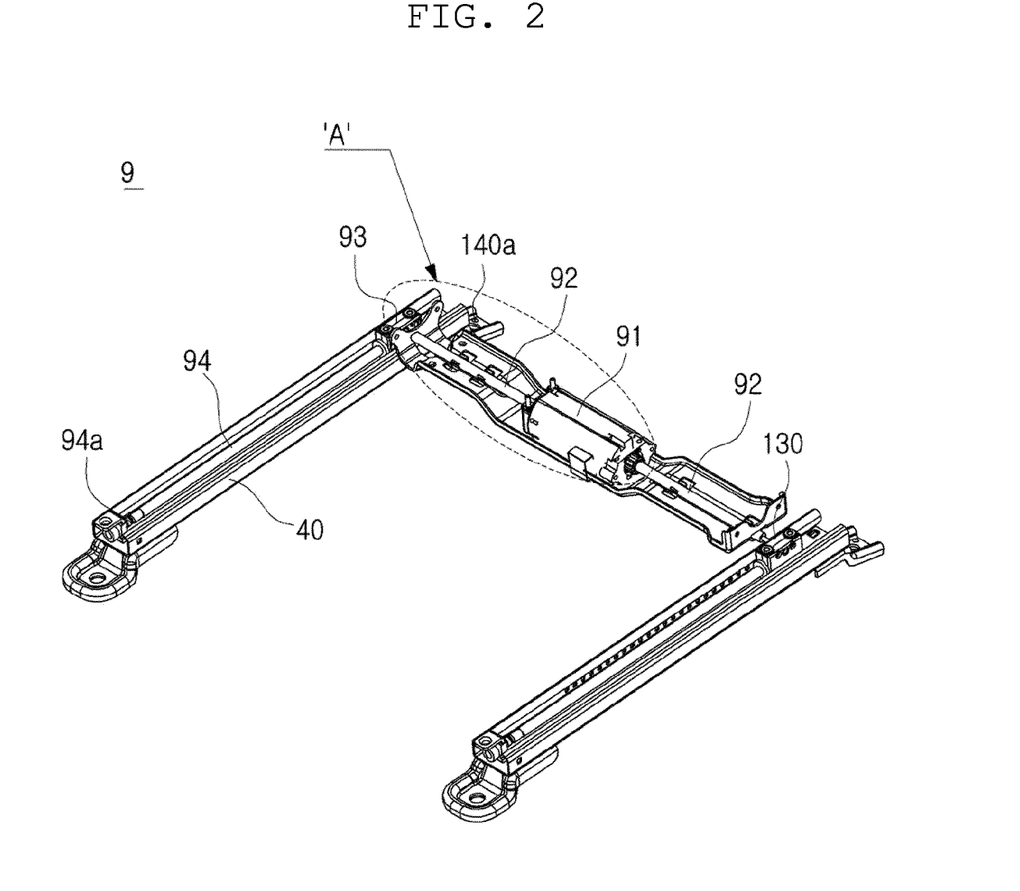
FIG. 2 is a perspective view showing a configuration of the seat moving apparatus for the vehicle in FIG. 1.
Figure 3:
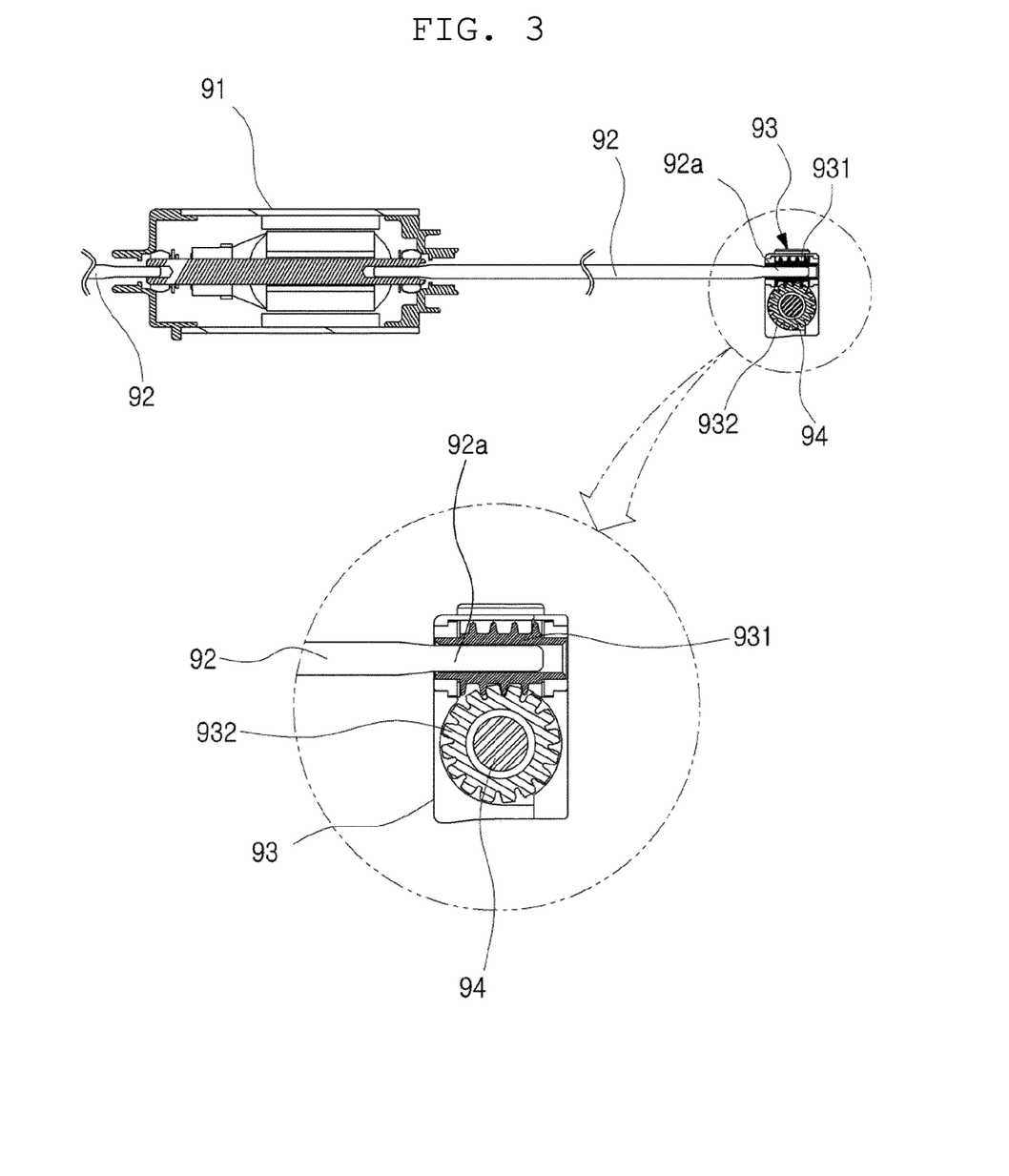
FIG. 3 is a longitudinal cross-sectional view of a portion "A" in FIG. 2.

As shown in FIGS. 1 to 3, a seat moving apparatus for a vehicle 9 is an apparatus configured to move a seat 10 of a vehicle in the forward-and-rearward direction using electric power of a drive motor 91. The seat moving apparatus for the vehicle 9 includes a lead screw 94 disposed in the forward-and-rearward movement direction of the seat 10, a rotating shaft 92 rotationally driven by the drive motor 91, and a gearbox 93 connected to the rotating shaft 92, the gearbox 93 receiving rotational driving force and moving along the lead screw 94.

The gearbox 93 has a worm gear 931 disposed therein and configured to rotate in engagement with an end portion 92a of the rotating shaft 92 and a worm wheel 932 disposed therein and configured to rotate in engagement with the worm gear 931, the worm wheel 932 having the inner circumferential surface thereof engaged with the lead screw 94 and reciprocating along the lead screw 94 by forward-and-reverse rotation.

Further, the lead screw 94 has an end portion 94a fixedly installed in a fixing frame 40 fixed to a vehicle body. Additionally, a seat frame 50 fixed to the seat is fixed to the gearbox 93.

Accordingly, when the drive motor 91 rotates in the forward or reverse direction, rotational driving force is transmitted to the rotating shaft 92, the worm gear 931, and the worm wheel 932, and then the worm wheel 932 moves forwards or rearwards on the lead screw 94 with the gearbox 93 and the seat frame 50, thereby moving the seat 10.

However, the seat moving apparatus 9 configured as described above is installed so that the seat moving apparatus 9 configured to move the seat 10 is entirely exposed to the interior space of the vehicle. Accordingly, foreign substances such as dust get stuck in the lead screw, and movement of the seat is hindered, thereby making it difficult to guarantee operation reliability of the seat moving apparatus for a long period of time. In addition to the above-described problem, a user may not sufficiently utilize the space under the seat, and the minimum height Hs of the seat 10 may be limited by the installation height of the fixing frame 40 and the lead screw 94.

Therefore, it is necessary to minimize the height occupied by a seat moving apparatus for a vehicle in the vehicle interior space to provide a comfortable vehicle interior space to a user, and to minimize foreign substances such as dust introduced into the seat moving apparatus for the vehicle to guarantee operational reliability of the seat moving apparatus for a long period of time.

The seat moving apparatus 9 having the above configuration is described in preparation for the present device, and it is not intended to describe configurations known prior to the filing date of the present disclosure.

DISCLOSURE

Technical Problem

Therefore, the present device has been made in view of the above problems, and it is an object of the present disclosure to lower the installation height of a seat moving apparatus for a vehicle configured to move a seat in the forward-and-rearward direction, thereby widely utilizing the interior space of the vehicle.

It is another object of the present disclosure to minimize the width of a slit hole formed corresponding to a movement path of a gearbox and formed through the floor surface of the interior space of the vehicle.

It is a further object of the present disclosure to improve operational reliability of the seat moving apparatus by minimizing the amount of foreign substances such as dust introduced through the slit hole.

Simultaneously, an object of the present disclosure is to further enhance power transmission efficiency in the gearbox.

Technical Solution

In accordance with the present disclosure, the above and other objects can be accomplished by the provision of a seat moving apparatus for a vehicle, the seat moving apparatus including a lead screw having a male screw thread formed on an outer circumference surface thereof, the lead screw being disposed in a forward-and-rearward direction of the vehicle below a floor surface of an interior space of the vehicle, a drive motor, a worm gear rotationally driven by the drive motor, a worm wheel configured to rotate in engagement with the worm gear, a transmission gear configured to rotate integrally with the worm wheel, a power transmission belt engaged with a spur gear of the transmission gear and formed in a closed curve shape, a moving wheel having a female screw thread formed on an inner circumferential surface thereof and engaged with the male screw thread, wherein the moving wheel has an outer gear part formed on an outer circumferential surface thereof and engaged with the power transmission belt, thereby being rotationally driven and moving along the lead screw, and a gearbox having an accommodation space provided therein and configured to accommodate the worm gear, the worm wheel, the power transmission belt, and the moving wheel, wherein a part of the gearbox is disposed below the floor surface and a remaining part thereof is exposed above the floor surface, wherein the remaining part of the gearbox is exposed through a slit hole formed on the floor surface.

Accordingly, the lead screw serving as a path configured to move a seat is disposed under the floor of the interior space of the vehicle, and only a part of the gearbox configured to move with the seat along the lead screw is installed to be exposed on the floor surface, thereby making it possible not only to improve user space utilization under the seat by not exposing the lead screw to the outside, but also to lower the seat installation height. As a result, it is possible to improve operational reliability of the seat moving apparatus by minimizing the amount of foreign substances introduced into the lead screw.

Here, the worm wheel and the transmission gear may form an integrally molded transmission gear body. Through this configuration, the internal space of the gearbox is formed to be smaller and the number of components is reduced, thereby making it possible to transmit power in a compact structure.

Further, the transmission gear body may have a protrusion formed at a center of rotation thereof and formed to protrude in an axial direction instead of installing a separate through shaft, and the protrusion may be installed to be rotatable by a bushing installed in the gearbox, thereby making it possible to accurately maintain the position of a rotating shaft in the gearbox while reducing the number of components.

The lead screw may be sealed except in the slit hole. Through this configuration, foreign substances other than those introduced through the slit hole are not introduced into the lead screw, thereby having an effect of more reliably preventing contamination by foreign substances.

The lead screws may be spaced apart from each other in two rows parallel to each other, and the worm gear configured to move with the moving wheel installed on each of the lead screws disposed in two rows may receive rotational driving force from a transmission shaft rotationally driven by the drive motor.

Furthermore, the gearbox may have a passage area passing through the slit hole, and the passage area may have a width formed to be smaller than a width of an upper portion of the gearbox and a width of a lower portion thereof. Through this configuration, the width of the slit hole maximally is reduced, thereby reducing the amount of foreign substances introduced into the lead screw.

The power transmission belt may have a narrow portion in a middle area between the transmission gear and the moving wheel. Through this configuration, the width of the slit hole is formed to be smaller, and the angle of the power transmission belt engaged with the transmission gear and the moving wheel becomes larger, thereby having an effect of transmitting rotational driving force while minimizing loss of power and improving energy efficiency.

To this end, it is preferable that the gearbox protrude inwards in the passage area and guide the power transmission belt to form the narrow portion.

"Forward-and-rearward direction" and terms similar thereto described in this specification and claims are defined as referring to the movement direction of the seat.

"Upper portion" and terms similar thereto described in this specification and claims are defined as referring to a direction from the floor surface toward the seat.

"Front" and terms similar thereto described in this specification and claims are defined as referring to a direction from the drive motor to the gearbox.

"Inwards" and terms similar thereto described in this specification and claims are defined as referring to a direction toward the center between the segmented casings forming the gearbox.

"Width" and terms similar thereto described in this specification and claims are defined as referring to the longitudinal direction of the torque transmission shaft 120.

Advantageous Effects

As described above, according to the present disclosure, a lead screw serving as a path configured to move a seat is disposed under the floor of the interior space of a vehicle, and only a part of a gearbox configured to move with the seat along the lead screw is installed to be exposed on the floor surface, thereby making it possible not only to improve user space utilization under the seat by not exposing the lead screw to the outside, but also to extend the height adjustment range of the seat by lowering the seat installation height.

In other words, according to the present disclosure, the lead screw is installed under the floor surface of the interior space of the vehicle, and only a part of the gearbox configured to move along the lead screw is exposed to the floor surface, thereby having an advantageous effect of lowering the installation height of the seat moving apparatus and widely utilizing the interior space of the vehicle.

Particularly, according to the present disclosure, a slit hole corresponding to a movement path of the gearbox is formed on the floor surface of the interior space of the vehicle, and the width of the gearbox is formed to be smaller in a passage area of the gearbox passing through the slit hole so that the width of the slit hole is formed to be smaller, thereby having an effect of minimizing the amount of foreign substances such as dust introduced through the slit hole and improving operational reliability of the seat moving apparatus.

Furthermore, according to the present disclosure, the small outer width of the gearbox is formed in the passage area of the gearbox passing through the slit hole, and a protrusion formed to protrude inwards in the gearbox is provided in the passage area, thereby forming the narrow width of a power transmission belt connecting a moving wheel to a transmission gear. Accordingly, the power transmission belt has a larger area surrounding the moving wheel and the transmission gear, thereby having an advantageous effect of increasing energy efficiency by transmitting rotational driving force with higher transmission efficiency.

DESCRIPTION OF DRAWINGS

The above and other objects, features and other advantages of the present device will be more clearly understood from the following detailed description taken in conjunction with the accompanying drawings, in which.

DETAILED DESCRIPTION

In order to achieve the above-described objects, the present device provides a seat moving apparatus for a vehicle, the seat moving apparatus including a lead screw having a male screw thread formed on an outer circumference surface thereof, the lead screw being disposed in a forward-and-rearward direction of a vehicle below a floor surface of an interior space of the vehicle, a drive motor, a worm gear rotationally driven by the drive motor, a worm wheel configured to rotate in engagement with the worm gear, a transmission gear configured to rotate integrally with the worm wheel, a power transmission belt engaged with a spur gear of the transmission gear and formed in a closed curve shape, a moving wheel having a female screw thread formed on an inner circumferential surface thereof and engaged with the male screw thread, wherein the moving wheel has an outer gear part formed on an outer circumferential surface thereof and engaged with the power transmission belt, thereby being rotationally driven and moving along the lead screw, and a gearbox having an accommodation space provided therein and configured to accommodate the worm gear, the worm wheel, the power transmission belt, and the moving wheel, wherein a part of the gearbox is disposed below the floor surface and a remaining part thereof is exposed above the floor surface. The remaining part of the gearbox is exposed through a slit hole formed on the floor surface.

Hereinafter, preferred embodiments of the present device will be described in detail with reference to the accompanying drawings, but the present invention is not limited or restricted by the embodiments. Wherever possible, the same reference numbers will be used throughout the drawings to refer to the same or like parts, and the embodiments may be described by referring to the contents described in the other drawings under this rule. The contents determined to be obvious to those skilled in the art or repeated may be omitted.

Figure 4:
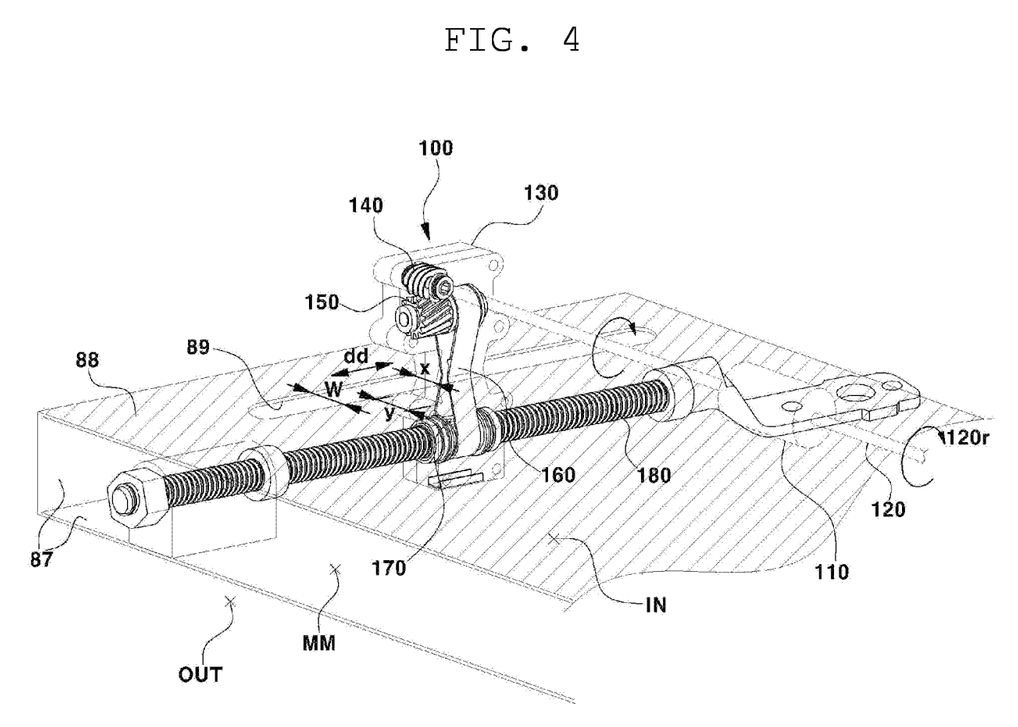
FIG. 4 is a perspective view showing one side portion of a configuration of a seat moving apparatus for a vehicle according to an embodiment of the present device.

As shown in the drawing, a seat moving apparatus for a vehicle 100 includes a drive motor 110, a torque transmission shaft 120 configured to perform rotation 120r in the forward direction or the reverse direction by the drive motor 110, a gearbox 130 having an upper portion coupled to the end portion of the torque transmission shaft 120 and a lower portion through which a lead screw 180 passes, the gearbox 130 having an accommodation space provided therein and being connected to a seat 10, a worm gear 140 disposed in an upper end space X4 of the accommodation space of the gearbox 130 and configured to receive rotational driving force from the torque transmission shaft 120, a transmission gear body 150 having a spur gear part 152 formed coaxially and integrally with a helical gear part 151 engaged with a male screw thread of the worm gear 140, the transmission gear body 150 being disposed in an upper space X5 of the accommodation space of the gearbox 130, a moving wheel 170 spaced apart from the transmission gear body 150 downwards and disposed in a lower end space X7 of the gearbox 130, a power transmission belt 160 configured to transmit rotational driving force in the vertical direction by allowing the spur gear part 152 of the transmission gear body 150 to be engaged with an outer gear part 170a of the moving wheel 170, and the lead screw 180 serving as a path configured to move the gearbox 130 and the seat 10 forwards and rearwards by rotation of the moving wheel 170.

The drive motor 110 is rotationally driven by power supplied from the outside, and the same includes a rotor having opposite sides thereof coupled to the torque transmission shaft 120. Here, the rotor performs rotation 120r of the torque transmission shaft 120 in the forward direction or the reverse direction. The drive motor 110 moves in the forward-and-rearward direction along with movement dd of the gearbox 130 in the forward-and-rearward direction.

Figure 11:
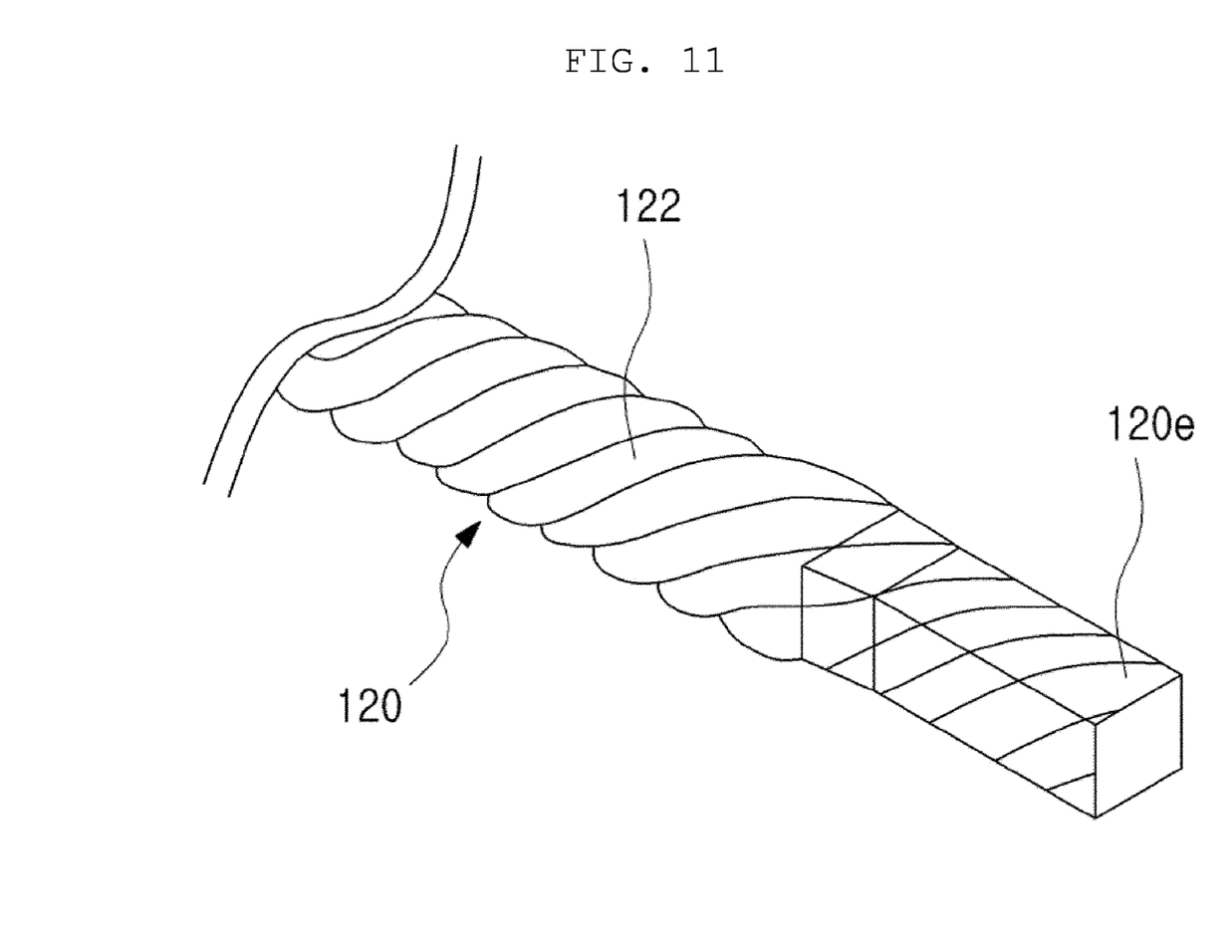
FIG. 11 is a perspective view showing the end portion of a rotating shaft in FIG. 4.

The torque transmission shaft 120 is formed by winding a thin wire 122 and is formed to enable bending deformation. The torque transmission shaft 120 has an end portion 120e press-formed into a non-circular cross section and inserted into a non-circular accommodation groove 140i of the worm gear 140.

Accordingly, rotational driving force of the drive motor 110 is transmitted to the worm gear 140 while generating torsional displacement of the torque transmission shaft 120, thereby rotating the worm gear 140. At the same time, even if deviation occurs between a movement distance of the gearbox 130 and a movement distance of the drive motor 110, bending deformation is tolerated because the torque transmission shaft 120 is formed by winding the thin wire 122, thereby smoothly transmitting rotational driving force from the drive motor 110 to the worm gear 140.

Figure 5:
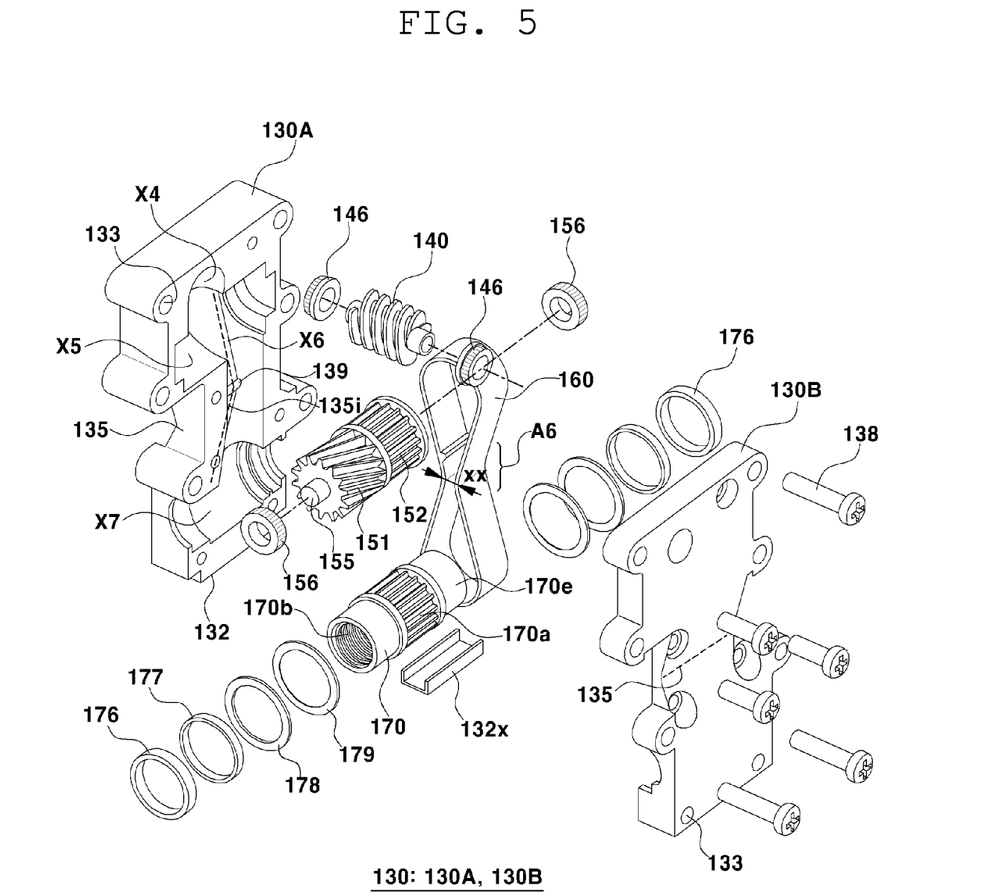
FIG. 5 is an exploded perspective view of a gearbox in FIG. 4.

As shown in FIG. 5, the gearbox 130 is formed by combining two segmented casings 130A and 130B with a fixing bolt 138 to provide an accommodation space therein. In a state in which the two segmented casings 130A and 130B are combined, a combination slide 132x having a U-shaped cross section may be provided to integrally fasten and fix the lower portions of the two segmented casings 130A and 130B, thereby making it possible to prevent the lower portions from being separated from each other.

Figure 6:
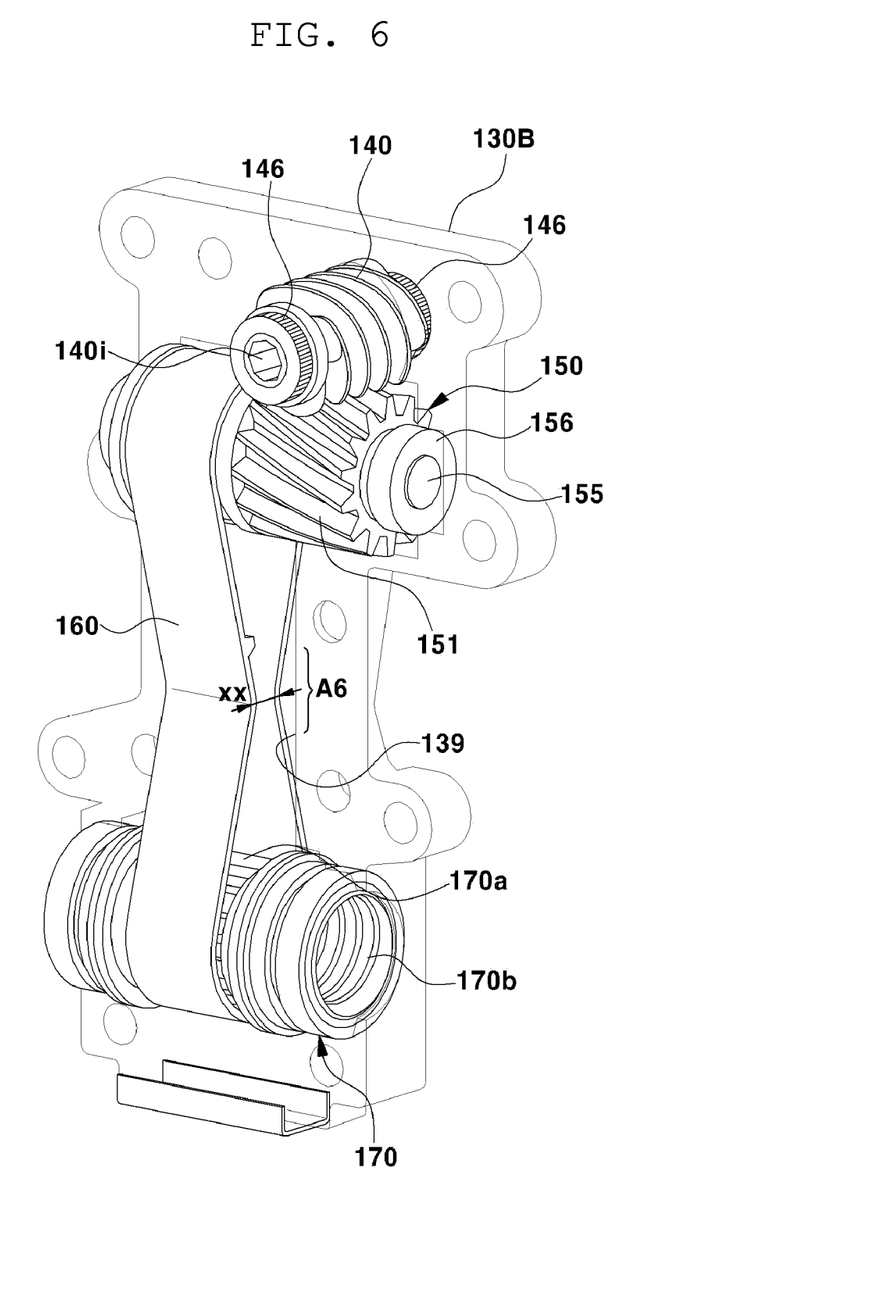
FIG. 6 is a perspective view showing an internal assembly view of a state in which a part of the gearbox in FIG. 4 is removed.

The worm gear 140 is rotatably accommodated in the upper end space X4 of the accommodation space of the gearbox 130, the transmission gear body 150 is rotatably accommodated with its posture perpendicular to the worm gear in the upper space X5 of the accommodation space of the gearbox 130, the moving wheel 170 is rotatably accommodated in parallel with the transmission gear body 150 in the lower end space X7 of the accommodation space of the gearbox 130, and the power transmission belt 160 is accommodated in the gearbox so as to connect the spur gear part 152 of the transmission gear body 150 to the outer gear part 170a of the moving wheel 170 in the vertical direction.

The worm gear 140 is rotatably installed in the upper space X4 by bushings 146 respectively provided on the opposite sides thereof, and the same accommodates the end portion 120e of the torque transmission shaft 120 and rotates integrally with the rotation 120r of the torque transmission shaft 120.

The worm gear 140 is rotatably installed in the upper space X4 of the gearbox 130 in a state of being rotationally supported by the bushings 146 disposed at the center of rotation.

The transmission gear body 150 has the helical gear part 151 and the spur gear part 152 formed to be integrated with each other. Here, the helical gear part 151 is engaged with the worm gear 140 and the spur gear part 152 is engaged with the power transmission belt 160. That is, the helical gear part 151 forms a worm wheel and the spur gear part 152 forms a transmission gear, which are injected into a single body and molded. For example, after the worm wheel having the helical gear part 151 is formed, the transmission gear having the spur gear part 152 may be injection molded.

Accordingly, the worm wheel having the helical gear part 151 configured to rotate by receiving rotational driving force from the worm gear 140 is not required to include a separate component configured to transmit rotational driving force to the transmission gear having the spur gear part 152, thereby making it possible to achieve a more compact structure.

The transmission gear body 150 has rotation protrusions 155 formed at the center of rotation thereof, the rotation protrusions 155 being respectively disposed at the opposite ends of the transmission gear body in the direction of the rotation axis. Here, the rotation protrusions 155 are rotatably installed in the upper space X5 of the gearbox 130 by ring-shaped bushings 156.

The power transmission belt 160 is formed in a closed curve shape, and the same is installed in a state of being engaged with the spur gear part 152 forming the transmission gear of the transmission gear body 150 and the outer gear part 170a formed on the outer circumferential surface of the moving wheel 170. Here, the spur gear part 152 and the outer gear part 170a respectively have gears formed at equal distances and respectively engaged with protrusions 160a formed on the inner surface of the power transmission belt 160.

The power transmission belt 160 is made of a flexible material such as rubber or resin, and the same is installed in a state of surrounding the spur gear part 152 of the transmission gear body 150 and the outer gear part 170a of the moving wheel 170, thereby transmitting rotational driving force from the transmission gear body 150 to the moving wheel 170.

Figure 8:
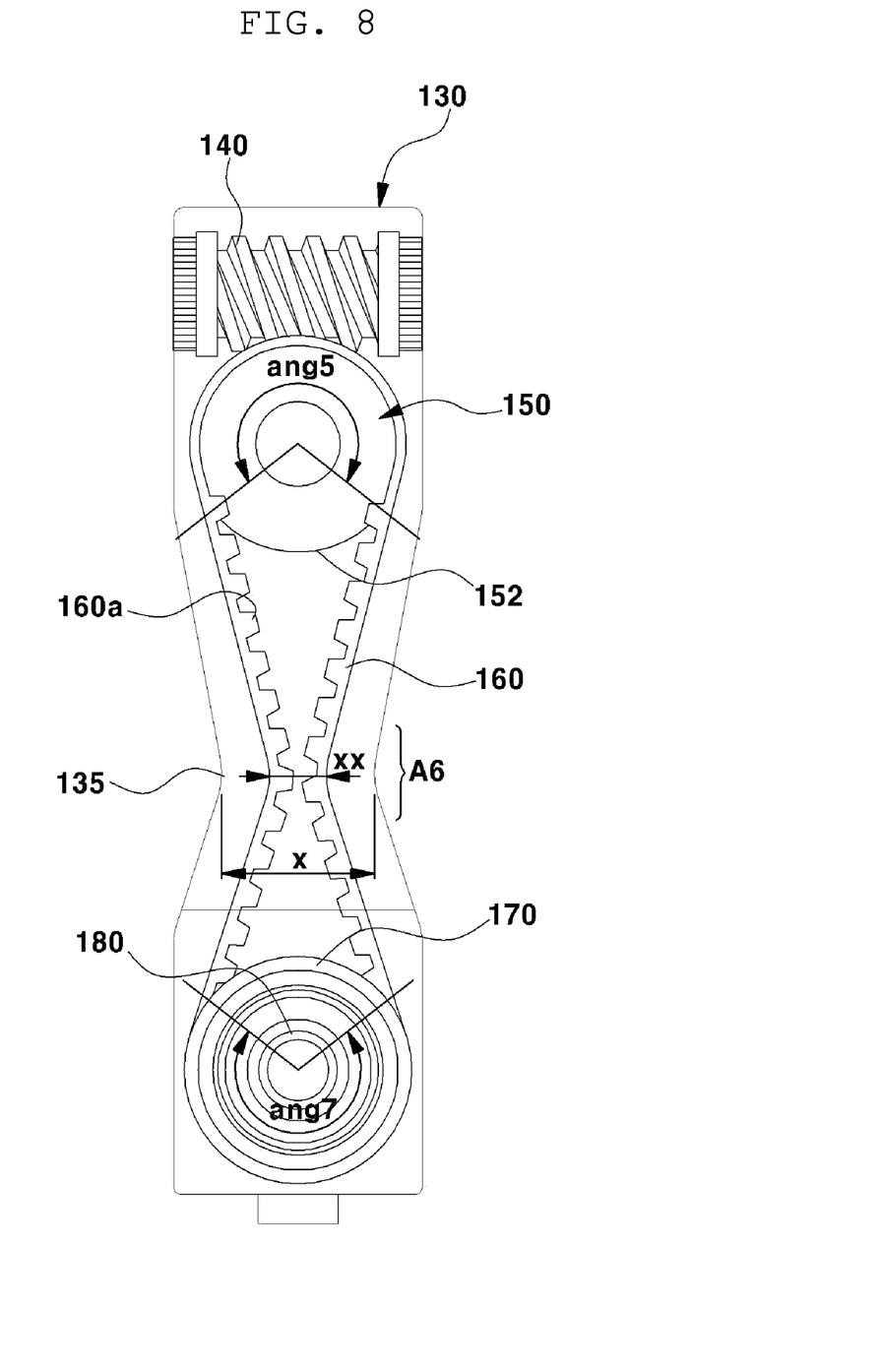
FIG. 8 is a side perspective view of FIG. 7.
Figure 9:
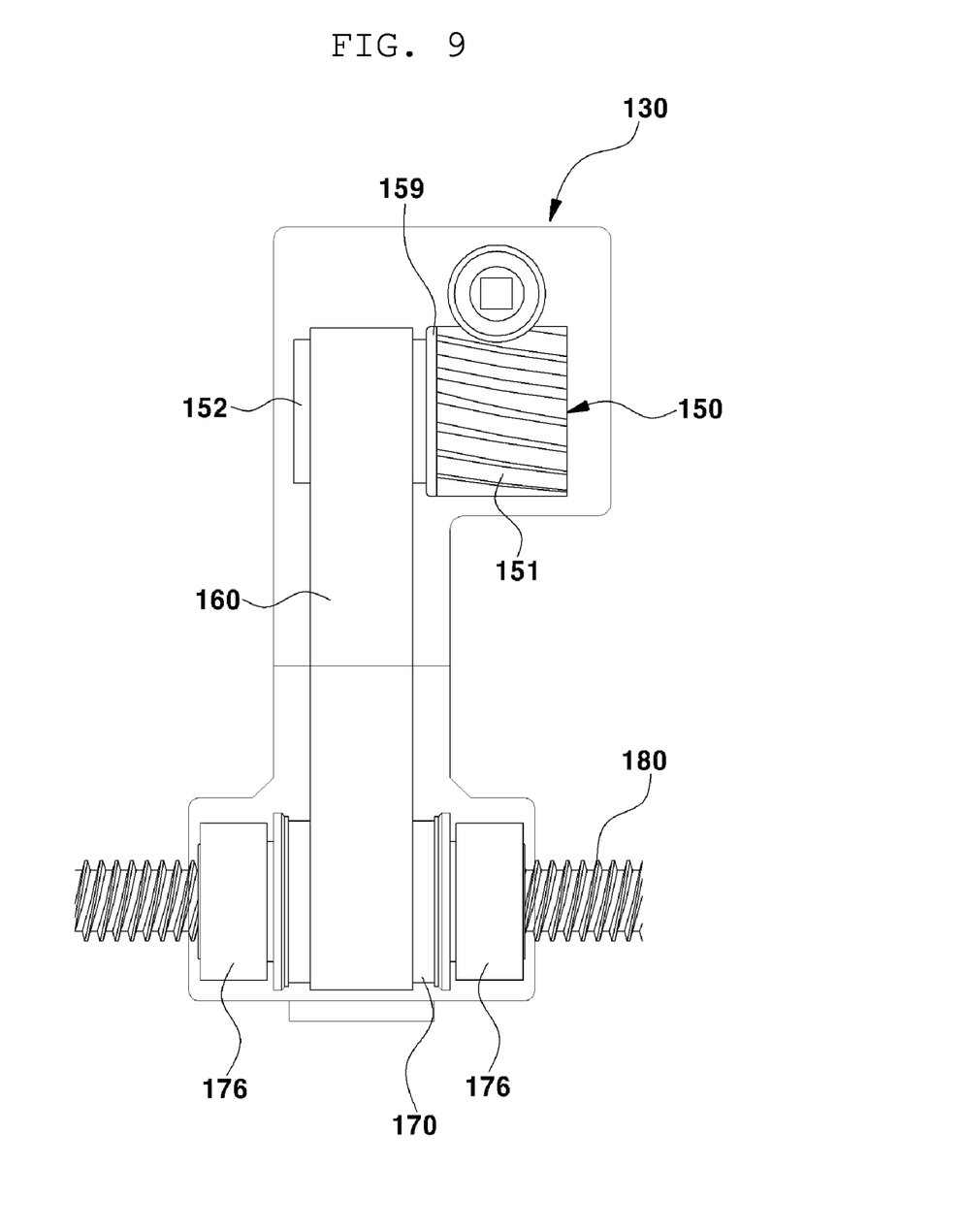
FIG. 9 is a front perspective view of FIG. 7.

Particularly, the power transmission belt 160 is installed in a state of surrounding the transmission gear of the transmission gear body 150 and the moving wheel 170 at angles ang5 and ang7 of 180 degrees or more, respectively. Accordingly, rotational driving force is transmitted from the transmission gear to the power transmission belt 160 without loss of power, and the rotational driving force is transmitted from the power transmission belt 160 to the moving wheel 170 without loss of power, thereby contributing to minimizing power consumption by minimizing the load required to transmit rotational driving force of the drive motor to the moving wheel 170.

Furthermore, the power transmission belt 160 may not only smoothly transmit power between the transmission gear body 150 and the moving wheel 170 spaced apart from each other in the vertical direction in the gearbox 130, but also maintain a constant shape or not occupy a large space, thereby having an effect of transmitting rotational driving force in the form of passing through a slit hole 89 having a small width w in a floor surface 88 of an interior space IN of a vehicle.

The moving wheel 170 is rotatably installed in the lower end space X7 of the gearbox 130 and is movably installed along the lead screw 180.

To this end, the moving wheel 170 has a female screw thread 170b formed on the inner circumferential surface thereof and engaged with a male screw thread formed on the outer circumferential surface of the lead screw 180. Accordingly, the moving wheel 170 and the lead screw 180 are installed in a state in which the male screw thread of the lead screw 180 and the female screw thread 170b of the moving wheel 170 are engaged with each other. In addition, since the moving wheel 170 has the outer gear part 170a formed on the outer circumferential surface thereof, the same is installed in a state of being engaged with the power transmission belt 160.

As shown in FIG. 5, the moving wheel 170 has an extension part 170e formed at the end portion thereof in the axial direction of the lead screw 180 and inserted into a bushing 176 installed in the gearbox 130. Accordingly, the moving wheel 170 is rotatably installed in the gearbox 130. Friction-reducing washers 179 configured to reduce friction with the gearbox 130 are respectively installed on the opposite sides of the outer gear part 170a in the axial direction, the friction-reducing washer 179 having an inner diameter larger than the outer diameter of the extension part 170e. A washer 178 is disposed outside the friction-reducing washer 179, and a ring-type damper 177 is disposed between the washer 178 and the bushing 176 to mitigate minute impact caused by play between the bushing 176 and the moving wheel 170. Here, the ring-type damper 177 is formed of a compressible material such as rubber, thereby having a function of mitigating minute impact acting at the moment when the movement of the moving wheel 170 in the forward-and-rearward direction is stopped.

As shown in FIG. 4, the lead screw 180 has the male screw thread formed on the outer circumferential surface thereof and engaged with the female screw thread 170b of the moving wheel 170, and the same is installed on a support surface 87 of an installation space MM disposed between the interior space IN and an outdoor space OUT of the vehicle.

Here, according to the preferred embodiment of the present device, the installation space MM is installed to be sealed so that there is no passage through which foreign substances are introduced except for the slit hole 89 formed on the floor surface 88. To this end, the lead screw 180 may be fixedly installed on the support surface 87, and the position of the support surface 87 may be fixed with respect to the floor surface 88 while the gearbox 130 is installed on the lead screw 180. For example, the support surface 87 may be formed of a solid material that is not deformed by external force, and may form a part of the vehicle body.

Figure 10:
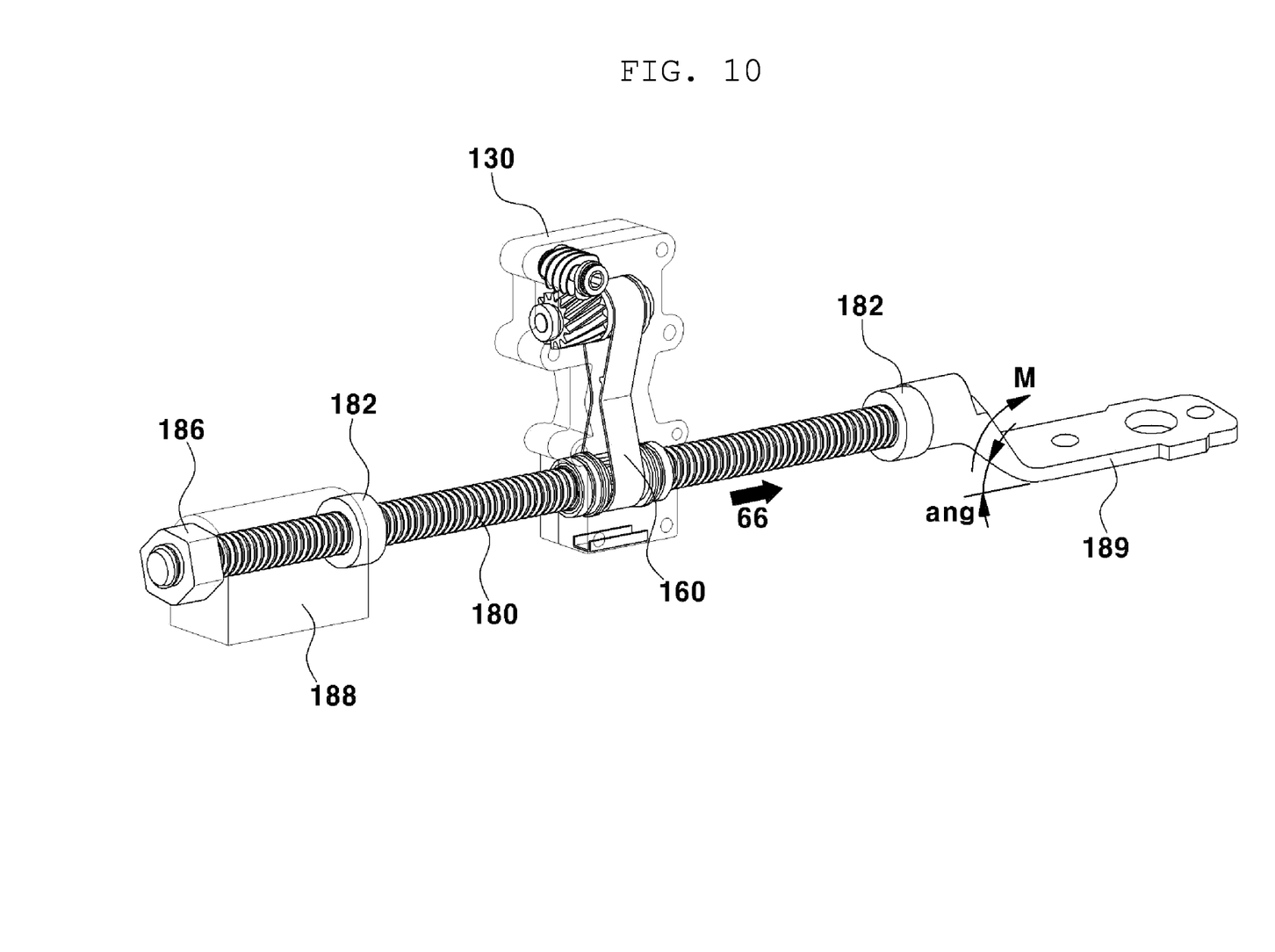
FIG. 10 is a perspective view showing one side portion of a lead screw excluding a drive motor.

As shown in FIG. 10, the lead screw 180 is supported by supports 188 and 189, the opposite ends of which are fixed to the support surface 87.

The front support 189 accommodates a front portion of the lead screw 180 at the upper side obliquely bent at an acute angle ang with respect to the support surface and fixes the front portion of the lead screw 180. Accordingly, even if force that causes the seat 10 to lean toward a front 66 due to a sudden accident or the like acts, and thus, moment indicated by a reference symbol M acts, an occupant is safely protected while seat separation is minimized by the bent portion of the front support 189.

The rear support 188 has a through hole through which the rear portion of the lead screw 180 passes, and the rear portion of the lead screw 180 is fixed by tightening the same with a fastening nut 186 in a state in which the rear portion passes through the through hole.

Ring-shaped end dampers 182 are respectively installed at the opposite end portions of the lead screw 180. The end damper is formed of a soft rubber material so as to absorb impact. Accordingly, even if the seat 10 of the vehicle is suddenly stopped by reaching the front end point or rear end point of the movement stroke of the seat 10, the end damper 182 absorbs static impact of the seat, thereby having an effect of allowing an occupant to feel the movement comfort and stability of a seat.

On the other hand, as shown in FIG. 4, the thin and long slit hole 89 is formed on the floor surface 88 of the vehicle interior space IN, and the gearbox 130 is installed so as to pass through the slit hole 89. To this end, as shown in FIG. 8, the outer surface of the gearbox 130 gradually decreases in width from the upper portion thereof toward a passage area A6, and the same gradually increases in width toward the lower portion thereof while passing through a boundary 135 in the passage area A6.

That is, an outer width x in the passage area A6 of the gearbox 130 passing through the slit hole 89 is smaller than upper and lower widths y of the gearbox 130, so that the overall width w of the slit hole 89 is formed to be small. Through this structure, the amount of foreign substances introduced through the slit hole 89 is very small in the installation space MM in which the lead screw 180 located below the floor surface 88 is installed, thereby having an advantageous effect of significantly reducing the possibility of an increase in load or malfunction due to contamination of the lead screw.

Since the outer width x in the passage area A6 of the gearbox 130 is formed to be small, a distance in the width direction in the passage area A6 of the accommodation space in the gearbox 130 is also formed to be smaller than a distance in the width direction of each of the upper and lower portions of the gearbox 130. That is, the segmented casings 130A and 130B facing each other of the gearbox 130 are combined to form the accommodation space therein, and a distance between the inner wall surfaces of the segmented casings 130A and 130B in an accommodation part at which the power transmission belt 160 is accommodated in the gearbox 130 is formed to be the smallest in the passage area A6.

For example, as shown in FIG. 5, an inner wall surface 135i of the segmented casing 130A forming the gearbox 130 may be obliquely formed so that the width of the inner wall surface 135i gradually decreases from the upper portion of the inner wall surface 135i to the passage area and the width thereof gradually increases from the passage area to the lower portion thereof, thereby having the smallest width in the portion corresponding to the passage area. In addition, an inwardly protruding protrusion 139 is formed on the inner wall surface of the gearbox 130 in the passage area A6. In this manner, since the internal shape of the gearbox 130 is formed to have the narrowest widthwise gap in the passage area A6, the power transmission belt 160 connecting the transmission gear to the moving wheel 170 in the closed curve shape is guided to the inner wall surface or the protrusion 139 in the passage area A6 to form a narrow portion, and the narrow portion in the passage area A6 forms a smallest width xx of the power transmission belt 160. For example, the width xx of the power transmission belt 160 in the passage area A6 is less than ½ of the diameter of the transmission gear or the moving wheel 170.

In this manner, since the power transmission belt 160 is formed to have the small width xx in the passage area A6, the contact angle ang5 of the power transmission belt 160 surrounding the spur gear part 152 of the transmission gear body 150 and the contact angle ang7 of the power transmission belt 160 surrounding the outer gear part 170a of the moving wheel 170 exceed 180 degrees, thereby obtaining a large contact angle such as about 220 degrees to 260 degrees. Therefore, it is possible to improve transmission efficiency of transmitting rotational driving force through the power transmission belt 160, thereby reducing the load on the drive motor. Accordingly, a seat may be moved with limited consumption of battery energy.

In the seat moving apparatus for the vehicle 100 according to the embodiment of the present device configured as described above, as shown in FIG. 7, when the drive motor 110 rotates the torque transmission shaft 120 in a first direction R1 to rotate the worm gear 140 rotating with the torque transmission shaft 120 in the first direction R1, the transmission gear body 150 having the helical gear part 151 engaged with the worm gear 140 rotates in a second direction R2. Further, while the power transmission belt 160 surrounding the transmission gear body 150 and the moving wheel 170 in the closed curve shape rotates in an endless-loop manner in a direction indicated by R3, the moving wheel 170 is rotated in a direction R4, which is the same direction as the second direction of the transmission gear body 150, through the power transmission belt 160. Since the female screw thread 170b on the inner circumferential surface of the moving wheel 170 is engaged with the male screw thread of the lead screw 180, rotation of the moving wheel 170 in the second direction causes the gearbox 130 to move forwards in a direction dl. Since the gearbox 130 is coupled to the seat 10, the seat 10 also moves forwards.

Figure 7:
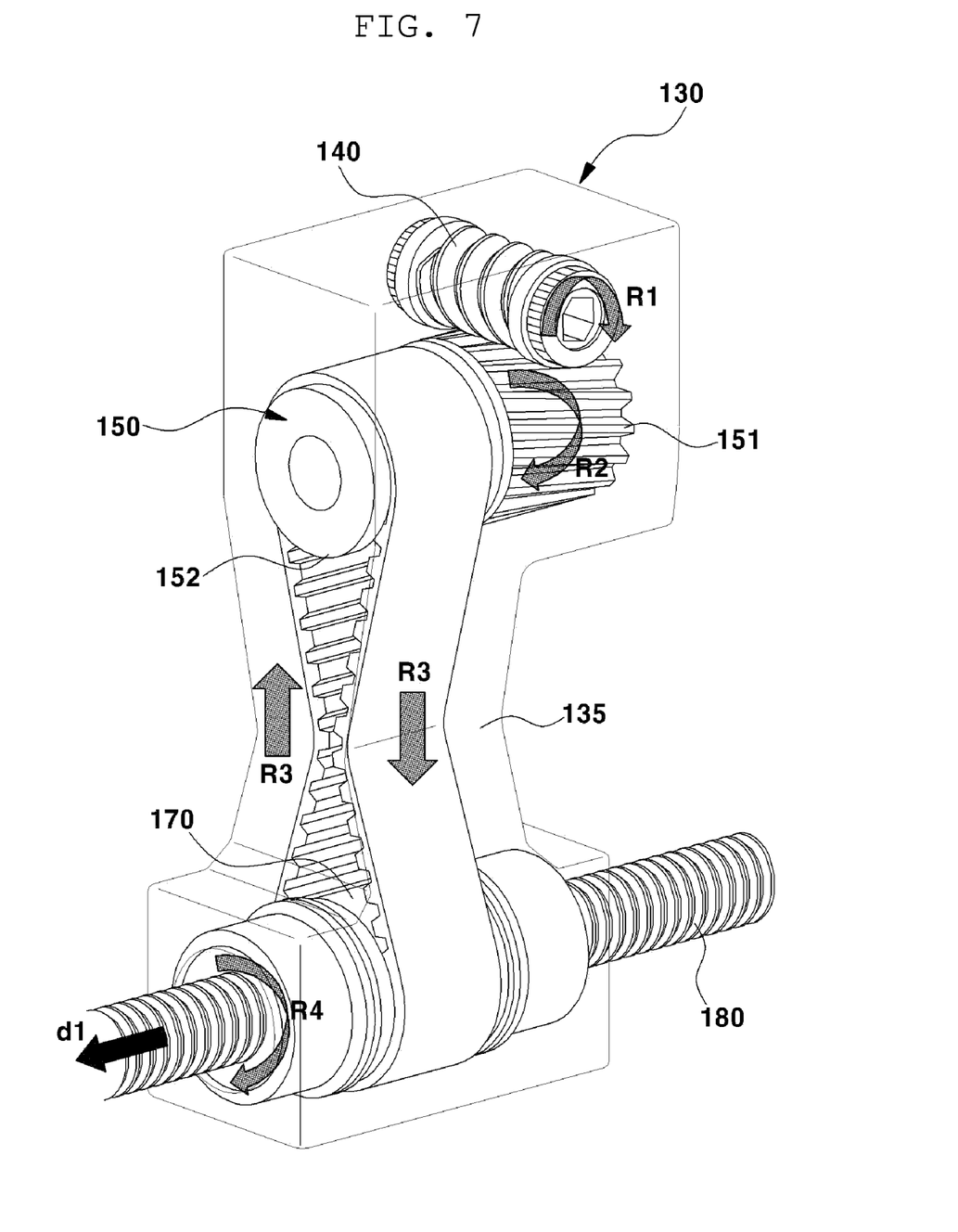
FIG. 7 is a perspective view illustrating the operating principle of the gearbox in FIG. 4.

Conversely, when the drive motor 110 rotates the torque transmission shaft 120 in a direction opposite the first direction to rotate the worm gear 140 rotating with the torque transmission shaft 120 in a direction opposite the first direction (opposite direction of R1), the transmission gear body 150 having the helical gear part 151 engaged with the worm gear 140 rotates in a direction opposite the second direction (opposite direction of R2). Further, while the power transmission belt 160 surrounding the transmission gear body 150 and the moving wheel 170 in the closed curve shape rotates in an endless-loop manner in a direction opposite the direction indicated by R3, the moving wheel 170 is rotated in a direction opposite the second direction of the transmission gear body 150 through the power transmission belt 160 (opposite direction of R4). Since the female screw thread 170b on the inner circumferential surface of the moving wheel 170 is engaged with the male screw thread of the lead screw 180, rotation of the moving wheel 170 in the direction opposite the second direction causes the gearbox 130 to move rearwards. Since the gearbox 130 is coupled to the seat 10, the seat 10 also moves rearwards.

In the seat moving apparatus for the vehicle 100 according to the embodiment of the present device configured as described above, the lead screw 180 serving as a path configured to move the seat is disposed under the floor surface 88 of the vehicle's interior space IN, and only the upper portion of the gearbox 130 moving with the seat 10 along the lead screw 180 is exposed on the floor surface 88, thereby protecting, from the outside, the lead screw 180 which is easily contaminated by foreign substances. Accordingly, it is possible not only to keep the surface condition of the lead screw 180 clean for a long period of time but also to have an advantageous effect of improving operational reliability of the seat moving apparatus.

In addition, the lead screw 180 conventionally installed in the vehicle's interior space is disposed outside the interior space IN, thereby increasing space utilization under the seat 10 of the vehicle. Further, since the minimum height of a seat is lowered, a wider range of seat height adjustment may be provided.

Particularly, the width x in the passage area A6 corresponding to the position of the slit hole 89 through which the gearbox 130 passes is formed to be small so that the width w of the slit hole 89 is formed to be very narrow, thereby making it possible to minimize the amount of foreign substances such as dust introduced through the slit hole. Accordingly, the width xx of the middle portion of the power transmission belt 160 is formed to be small to obtain a large contact angle between the power transmission belt 160 and the transmission gear body 150 and a large contact angle between the power transmission belt 160 and the moving wheel 170, thereby having an advantageous effect of increasing transmission efficiency of rotational driving force and lowering the load of a motor.

Although preferred embodiments of the present device have been disclosed for illustrative purposes, those skilled in the art will appreciate that various modifications, additions and substitutions are possible, without departing from the scope and spirit of the invention as disclosed in the accompanying claims.

What is claimed is:

1. A seat moving apparatus for a vehicle, the seat moving apparatus comprising:
    a lead screw having a male screw thread formed on an outer circumference surface thereof, the lead screw configured to be disposed in a forward-and-rearward direction of the vehicle below a floor surface of an interior space of the vehicle;
    a drive motor;
    a torque transmission shaft rotated by the drive motor;
    a worm gear configured to be rotationally driven by the torque transmission shaft;
    a transmission gear body configured to rotate in engagement with the worm gear;
    a power transmission belt configured to be engaged with the transmission gear body;
    a moving wheel having a female screw thread formed on an inner circumferential surface thereof and configured to be engaged with the male screw thread, wherein the moving wheel is rotationally driven by the power transmission belt and is moved along the lead screw.

2. The seat moving apparatus according to claim 1, wherein the moving wheel comprises an outer gear part configured to be engaged with the power transmission belt, and the outer gear part is engaged with protrusions formed on an inner surface of the power transmission belt.

3. The seat moving apparatus according to claim 1, wherein the transmission gear body comprises a worm wheel configured to rotate in engagement with the worm gear and a transmission gear in engagement with the power transmission belt.

4. The seat moving apparatus according to claim 1, wherein a ring-shaped end damper is provided at an end portion of the lead screw.

5. The seat moving apparatus according to claim 1, further comprising a gearbox having an accommodation space provided therein, wherein the accommodation space is configured to accommodate the worm gear, the transmission gear body, the power transmission belt, and the moving wheel.

6. The seat moving apparatus according to claim 5, wherein the moving wheel is installed in the gearbox so as to be rotated by a bushing, and
    wherein a ring-shaped damper is provided between the bushing and an outer gear part.

7. The seat moving apparatus according to claim 5, wherein a part of the gearbox is disposed below the floor surface and a remaining part thereof is exposed above the floor surface, and
    wherein the remaining part of the gearbox is exposed through a slit hole formed on the floor surface.

8. The seat moving apparatus according to claim 7, wherein the gearbox includes a passage area extending through the slit hole, and the passage area has an outer width formed to be smaller than a width of an upper portion of the gearbox and a width of a lower portion thereof.

9. The seat moving apparatus according to claim 8, wherein the gearbox includes segmented casings arranged to face each other, the segmented casings are combined to form the accommodation space in the gearbox, and a distance between inner wall surfaces of the segmented casings in an accommodation part of the gearbox is the shortest in the passage area, and the power transmission belt is accommodated in the accommodation part.

10. The seat moving apparatus according to claim 9, wherein the power transmission belt is configured to connect the transmission gear body to the moving wheel in a closed curve shape, and includes a narrow portion by an inwardly protruding protrusion on the inner wall surfaces in the passage area.

11. The seat moving apparatus according to claim 10, wherein the power transmission belt is formed to have a contact angle surrounding each of a worm wheel of the transmission gear body and an outer gear part of the moving wheel exceed 180 degrees.

12. The seat moving apparatus according to claim 5, wherein the transmission gear body includes rotation protrusions formed at a center of rotation thereof, and the rotation protrusions are rotated by a bushing in the gearbox.

\* \* \* \* \*